United States Patent
Takada et al.

(10) Patent No.: US 12,432,031 B2
(45) Date of Patent: Sep. 30, 2025

(54) TERMINAL

(71) Applicant: NTT DOCOMO, INC., Tokyo (JP)

(72) Inventors: Takuma Takada, Tokyo (JP); Naoki Fujimura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 486 days.

(21) Appl. No.: 17/616,907

(22) PCT Filed: Jun. 7, 2019

(86) PCT No.: PCT/JP2019/022822
§ 371 (c)(1),
(2) Date: Dec. 6, 2021

(87) PCT Pub. No.: WO2020/246043
PCT Pub. Date: Dec. 10, 2020

(65) Prior Publication Data
US 2022/0329380 A1    Oct. 13, 2022

(51) Int. Cl.
*H04L 5/00* (2006.01)
*H04L 27/26* (2006.01)

(52) U.S. Cl.
CPC .......... *H04L 5/0051* (2013.01); *H04L 5/0078* (2013.01); *H04L 5/0092* (2013.01); *H04L 27/26025* (2021.01)

(58) Field of Classification Search
CPC ..... H04L 5/001; H04L 5/0023; H04L 5/0032; H04L 5/0048; H04L 5/0051; H04L 5/0064; H04L 5/0078; H04L 5/0091; H04L 5/0092; H04L 27/26025; H04W 72/02
See application file for complete search history.

(56) References Cited

U.S. PATENT DOCUMENTS

| | | | |
|---|---|---|---|
| 2017/0150462 A1 | 5/2017 | Zeng et al. | |
| 2017/0332370 A1 | 11/2017 | Rico Alvarino et al. | |
| 2018/0198581 A1* | 7/2018 | Miao | H04L 5/0085 |
| 2019/0165908 A1* | 5/2019 | Takeda | H04L 5/0048 |
| 2022/0046450 A1* | 2/2022 | Wang | H04W 24/08 |
| 2022/0116172 A1* | 4/2022 | Tang | H04L 5/0098 |
| 2022/0140975 A1* | 5/2022 | Siomina | H04L 5/0051 |
| | | | 370/329 |

FOREIGN PATENT DOCUMENTS

| | | |
|---|---|---|
| JP | 2017-528054 A | 9/2017 |
| WO | 2017/196546 A1 | 11/2017 |

OTHER PUBLICATIONS

MediaTek Inc., "Interruption at SRS Carrier Switching", 3GPP TSG-RAN WG4 Meeting #90, R4-1900683, Athens, Greece, Feb. 25-Mar. 1, 2019 (Year: 2019).*

(Continued)

*Primary Examiner* — Ayaz R Sheikh
*Assistant Examiner* — David Zhijun Sun
(74) *Attorney, Agent, or Firm* — Osha Bergman Watanabe & Burton LLP

(57) ABSTRACT

A terminal is disclosed including a transmission unit that transmits a Sounding Reference Signal (SRS) and a control unit that switches a carrier so as to transmit the SRS. The control unit determines a period during which no signal transmission is performed in radio frames used in a serving cell, based on a subcarrier spacing of a cell corresponding to a switching destination carrier.

3 Claims, 11 Drawing Sheets

(56) References Cited

OTHER PUBLICATIONS

Sony, "Summary of SRS", 3GPP TSG RAN WG1 Meeting #94, R1-1809519, Gothenburg, Sweden, Aug. 20-24, 2018. (Year: 2018).*
Office Action issued in the counterpart Japanese Patent Application No. 2021-524652, mailed on Apr. 4, 2023 (6 pages).
MediaTek Inc.; "Interruption at SRS Carrier Switching"; 3GPP TSG-RAN WG4 Meeting #90, R4-1900683; Athens, Greece; Feb. 25-Mar. 1, 2019 (5 pages).
International Search Report issued in PCT/JP2019/022822 on Jan. 7, 2020 (2 pages).
Written Opinion of the International Searching Authority issued in PCT/JP2019/022822 on Jan. 7, 2020 (4 pages).
Huawei; "Consideration on SRS switching time reporting"; 3GPP TSG-RAN WG4 Meeting #80bis, R4-167659; Ljubljana, Slovenia; Oct. 10-14, 2016 (3 pages).
Sony; "Summary of SRS"; 3GPP TSG RAN WG1 Meeting #94, R1-1809519; Gothenburg, Sweden; Aug. 20-24, 2018 (5 pages).
Huawei, HiSilicon; "Discussion on other RRM requirements in SRS switching"; 3GPP TSG-RAN WG4 Meeting #81, R4-1610110; Reno, Nevada; Nov. 14-18, 2016 (3 pages).
ETSI TS 138 213 V15.5.0; "5G; NR; Physical layer procedures for control (3GPP TS 38.213 version 15.5.0 Release 15)"; May 2019; (106 pages).
Office Action issued in Australian Patent Application No. 2019449694, dated Oct. 30, 2024 (4 pages).

\* cited by examiner

FIG. 7

| SCS (kHz) USED IN WHICH SWITCHING DESTINATION CC IS CONFIGURED | TRANSMISSION/RECEPTION DISABLED AREA FOR UE SUPPORTING Per-UE gap (NUMBER OF SLOTS) | | | | | | | |
|---|---|---|---|---|---|---|---|---|
| | Sync-DC | | | | Async-DC | | | |
| | SCS 15kHz | SCS 30kHz | SCS 60kHz | SCS 120kHz | SCS 15kHz | SCS 30kHz | SCS 60kHz | SCS 120kHz |
| 15 | 2 | 3 | 6 | 12 | 3 | 4 | 7 | 13 |
| 30 | 2 | 3 | 5 | 10 | 3 | 4 | 6 | 11 |
| 60 | | | ... | ... | | | | |
| 120 | | | | | | | | |

ADD 1 SLOT TO NUMBER OF SLOTS

FIG. 8

| SCS (kHz) USED IN CELL IN WHICH SWITCHING DESTINATION CC IS CONFIGURED | TRANSMISSION/RECEPTION DISABLED AREA FOR UE SUPPORTING Per-FR gap (NUMBER OF SLOTS) | | | | | | | |
|---|---|---|---|---|---|---|---|---|
| | Sync-DC | | | | Async-DC | | | |
| | SCS 15kHz | SCS 30kHz | SCS 60kHz | SCS 120kHz | SCS 15kHz | SCS 30kHz | SCS 60kHz | SCS 120kHz |
| 15 | 2 | | | | | | | |
| 30 | | 3 | | | | | | |
| 60 | | | 4 | | | | | |
| 120 | | | | 6 | 3 | 4 | 5 | 7 |

ADD 1 SLOT TO NUMBER OF SLOTS

FIG. 9

| SWITCHING TIME (μs) | TRANSMISSION/RECEPTION DISABLED AREA FOR UE SUPPORTING Per-UE gap (NUMBER OF SLOTS) | | | | | | | |
|---|---|---|---|---|---|---|---|---|
| | Sync-DC | | | | Async-DC | | | |
| | SCS 15kHz | SCS 30kHz | SCS 60kHz | SCS 120kHz | SCS 15kHz | SCS 30kHz | SCS 60kHz | SCS 120kHz |
| ⋮ | | | | | | | | |
| 300 | 1 | 2 | 2 | 3 | 2 | 3 | 3 | 4 |
| 500 | 1 | 2 | 3 | 6 | 2 | 3 | 4 | 7 |
| ⋮ | | | | | | | | |

ADD 1 SLOT TO NUMBER OF SLOTS

FIG. 10

| CASE | | UE SUPPORTING Per-UE gap | UE SUPPORTING Per-FR gap |
|---|---|---|---|
| 1 | LTE→LTE | TRANSMISSION DISABLED AREAS OCCUR IN ALL SERVING CELLS | TRANSMISSION DISABLED AREAS OCCUR IN ALL SERVING CELLS |
| 2 | NR FR1→NR FR1 | TRANSMISSION DISABLED AREAS OCCUR IN ALL SERVING CELLS | TRANSMISSION DISABLED AREA OCCURS IN SERVING CELL OF FR1 TRANSMISSION DISABLED AREA DOES NOT OCCUR IN SERVING CELL OF FR2 |
| 3 | NR FR2→NR FR1 | TRANSMISSION DISABLED AREAS OCCUR IN ALL SERVING CELLS | TRANSMISSION DISABLED AREAS OCCUR IN ALL SERVING CELLS |
| 4 | NR FR1→NR FR2 | TRANSMISSION DISABLED AREAS OCCUR IN ALL SERVING CELLS | TRANSMISSION DISABLED AREAS OCCUR IN ALL SERVING CELLS |
| 5 | NR FR2→NR FR2 | TRANSMISSION DISABLED AREAS OCCUR IN ALL SERVING CELLS | TRANSMISSION DISABLED AREA DOES NOT OCCUR IN SERVING CELL OF FR1 TRANSMISSION DISABLED AREA OCCURS IN SERVING CELL OF FR2 |

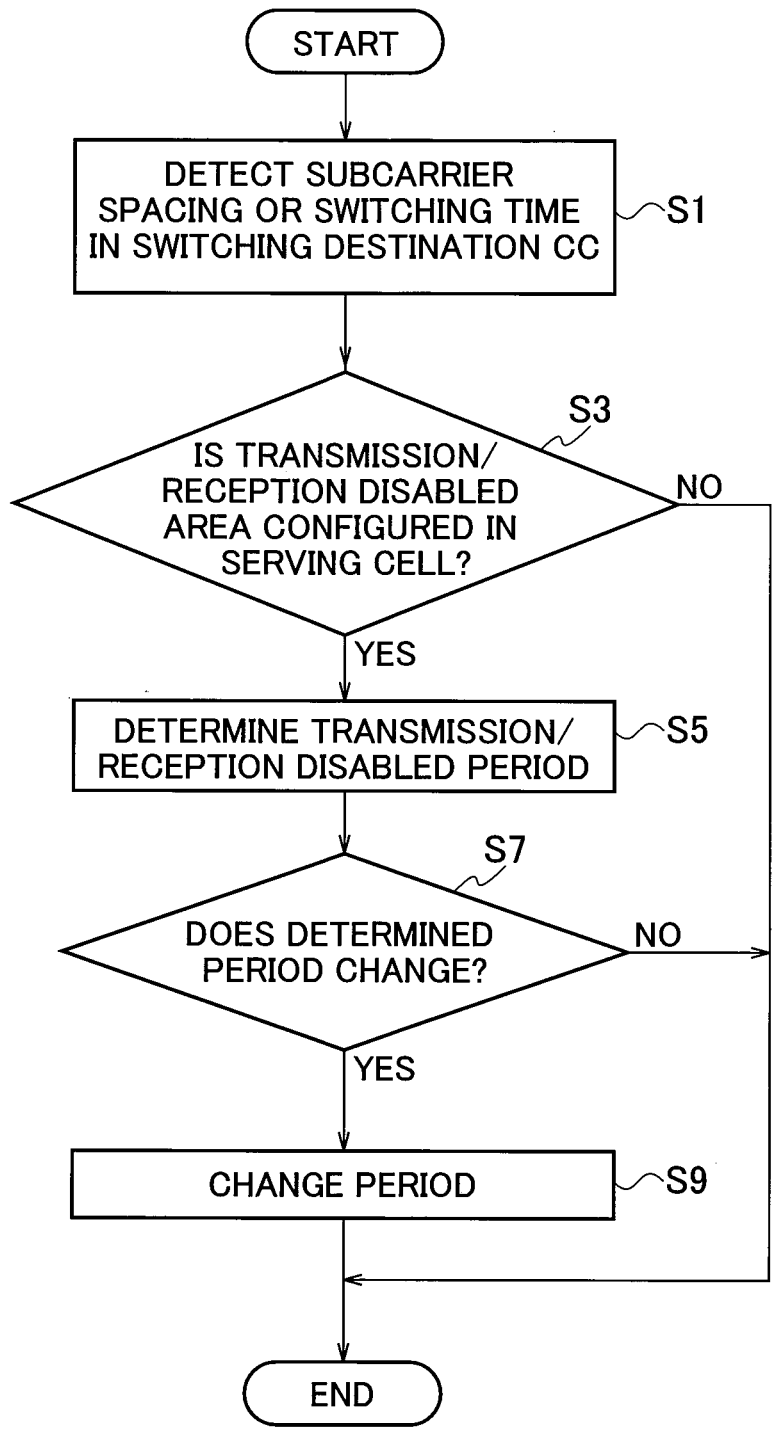

TERMINAL

TECHNICAL FIELD

The present invention relates to a terminal that switches a carrier so as to transmit a channel quality measurement reference signal.

BACKGROUND ART

The 3rd Generation Partnership Project (3GPP) specifies Long Term Evolution (LTE) and specifies LTE-Advanced (hereinafter, collectively referred to as LTE) for the purpose of further speeding up LTE. In addition, in the 3GPP, specifications of a succession system of LTE, called 5G, New Radio (NR) or the like, have been studied.

A radio base station measures uplink quality by using a channel quality measurement reference signal (Sounding Reference Signal, hereinafter referred to as an SRS) received via an uplink, and estimates a downlink state based on the measurement result.

In a Carrier Aggregation (CA), an uplink component carrier (UL CC) and a downlink component carrier (DL CC) are generally associated with each other, but the number of DL CCs can be configured to be larger than the number of UL CCs. In other words, a DL CC (also called DL only CC) that is not associated with a UL CC exists.

Since a UL CC to be associated with the DL CC does not exist, the SRS for the DL CC is not transmitted. Therefore, the NR specifies an operation in which a terminal temporarily switches a DL CC, which is not associated with a UL CC, to the UL CC and transmits an SRS (hereinafter referred to as SRS carrier switching) (see Non Patent Document 1).

PRIOR ART DOCUMENT

Non-Patent Document

Non Patent Document 1: 3GPP TS 38.213 V15.5.0 3rd Generation Partnership Project; Technical Specification Group Radio Access Network; NR; Physical layer procedures for control (Release 15), 3GPP, March 2019

SUMMARY OF THE INVENTION

If SRS carrier switching is performed, a terminal needs to perform processing of retuning a transmission high-frequency circuit to a frequency of a DL CC that is not associated with a UL CC (hereinafter referred to as RF retuning).

The terminal cannot transmit a signal while RF retuning is performed. Therefore, when SRS carrier switching is performed, there is a possibility that the influence occurs in a serving cell in which the terminal performs communication.

Therefore, the present invention has been made in view of such a circumstance, and an object of the present invention is to provide a terminal capable of reducing the influence on communication in a serving cell even if a carrier is switched so as to transmit a channel quality measurement reference signal.

According to one aspect of the present invention, there is provided a terminal (200) including: a transmission unit (210) that transmits a channel quality measurement reference signal (SRS); and a control unit (230) that switches a carrier (CC) so as to transmit the channel quality measurement reference signal (SRS), wherein the control unit (240) determines a period during which no signal transmission and reception is performed in radio frames used in a serving cell, based on a subcarrier spacing (SCS) used in a cell in which a switching destination carrier (CC) is configured.

According to one aspect of the present invention, there is provided a terminal (200) including: a transmission unit (210) that transmits a channel quality measurement reference signal (SRS); and a control unit (230) that switches a carrier (CC) so as to transmit the channel quality measurement reference signal (SRS), wherein the control unit (240) determines a period during which no signal transmission and reception is performed in radio frames used in a serving cell, based on a value of a carrier (CC) switching time.

BRIEF DESCRIPTION OF DRAWINGS

FIG. 7 is a diagram illustrating an association between a subcarrier spacing used in a cell in which a switching destination CC is configured and a period during which no signal transmission and reception is performed.

FIG. 8 is a diagram illustrating an association between a subcarrier spacing used in a cell in which a switching destination CC is configured and a period during which no signal transmission and reception is performed.

FIG. 9 is a diagram illustrating an association between a switching time and a period during which no signal transmission and reception is performed.

FIG. 10 is a diagram illustrating a condition for applying, to the terminal 200, a configuration of a period during which no signal transmission and reception is performed.

FIG. 11 is a diagram illustrating an operation flow of the terminal 200 when a period during which no signal transmission and reception is performed is determined.

MODES FOR CARRYING OUT THE INVENTION

Figure 1:
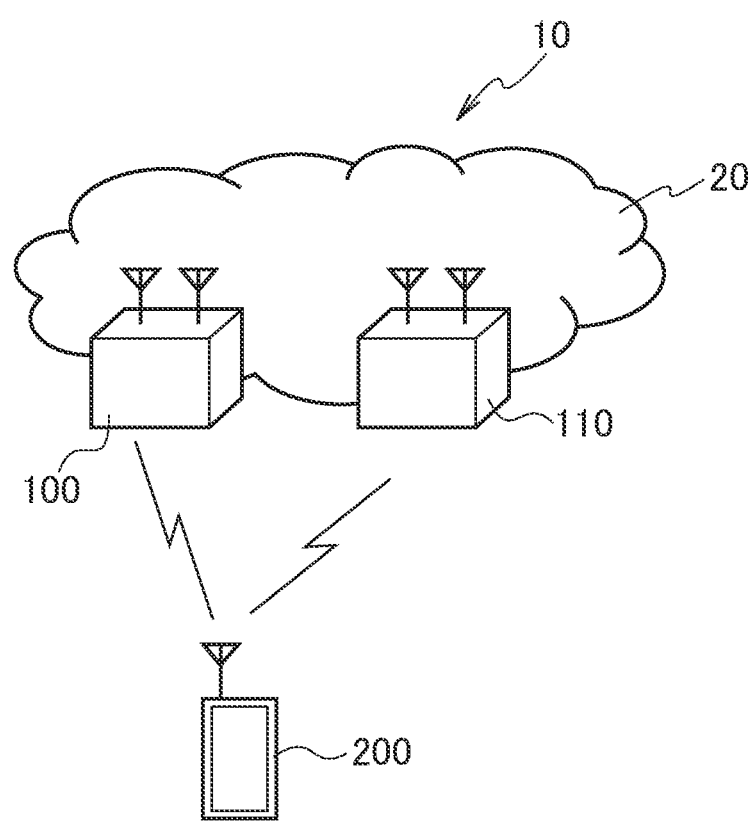
FIG. 1 is an overall schematic configuration diagram of a radio communication system 10.

Hereinafter, embodiments will be described with reference to the drawings. Note that the same functions or configurations are denoted by the same or similar reference numerals, and a description thereof will be omitted as appropriate.

(1) Overall Schematic Configuration of Radio Communication System

FIG. 1 is an overall schematic configuration diagram of a radio communication system 10 according to an embodiment. The radio communication system 10 is a radio communication system in accordance with 5G (NR).

As illustrated in FIG. 1, the radio communication system 10 includes a Next Generation-Radio Access Network 20 (hereinafter, NG-RAN 20) and a terminal 200. Note that the terminal is also referred to as a UE.

The NG-RAN 20 includes a radio base station 100 and a radio base station 110. Note that a specific configuration of the radio communication system 10, including the number of radio base stations and the number of terminals, is not limited to the example illustrated in FIG. 1.

The NG-RAN 20 actually includes a plurality of NG-RAN nodes, specifically gNBs (or ng-eNBs), and is connected to a core network (5GC, not illustrated) in accordance with NR. Note that the NG-RAN 20 and the 5GC may be simply expressed as "network".

Each of the radio base stations 100 and 110 is a gNB or an ng-eNB. The radio base stations 100 and 110 perform radio communication between the radio base stations 100 and 110 and the terminal 200 in accordance with NR.

The radio base stations 100 and 110 and the terminal 200 can support Massive MIMO that generates beams with higher directivity by controlling radio signals transmitted from a plurality of antenna elements, Carrier Aggregation (CA) using a plurality of Component Carriers (CCs), Dual Connectivity (DC) that simultaneously transmits CCs between a plurality of NG-RAN nodes and a terminal, and the like. Note that the CC is also referred to as a carrier.

The radio communication system 10 may include an Evolved Universal Terrestrial Radio Access Network (E-UTRAN) instead of the NG-RAN 20. In this case, the E-UTRAN includes a plurality of E-UTRAN nodes, specifically, eNBs and en-gNBs, and is connected to a core network (EPC, not illustrated) in accordance with LTE. In this case, each of the radio base stations 100 and 110 is an eNB or an en-gNB.

In the radio communication system 10, a plurality of frequency ranges (FR) is configured. Specifically, FR1 and FR2 are configured. In the present embodiment, FR1 and FR2 are as follows.

FR1 (Frequency Range 1): 450 to 6,000 MHz
FR2 (Frequency Range 2): 24,250 to 52,600 MHz Based on this FR configuration, a Per-UE gap and a Per-FR gap are defined in the NR as the capability of the terminal 200 regarding a measurement gap.

By configuring the measurement gap, the terminal 200 stops transmission and reception of signals in a communicating serving cell during the measurement gap and measures the quality of a different frequency cell that uses a frequency different from a frequency being used by the cell. A value of the measurement gap is a fixed value.

In the terminal 200 supporting the Per-UE gap, one type of measurement gap is configured. Therefore, the terminal 200 supporting the Per-UE gap measures the quality of the different frequency cell by using a common measurement gap.

Therefore, the terminal 200 supporting the Per-UE gap uses the common measurement gap in a cell using a frequency band classified as FR1 and a cell using a frequency band classified as FR2.

On the other hand, in the terminal 200 supporting the Per-FR gap, different measurement gaps are configured in FR1 and FR2. Therefore, the terminal 200 supporting the Per-FR gap measures the quality of the different frequency cell by using the measurement gap corresponding to the frequency band of the frequency being used by the different frequency cell.

Therefore, for example, even if the measurement gap is configured on the FR1 side, the terminal 200 supporting the Per-FR gap can continue to transmit and receive signals on the FR2 side during the measurement gap because the measurement gap does not affect the FR2 side.

The terminal 200 transmits an SRS to each radio base station via a physical uplink shared channel (PUSCH) based on downlink control information transmitted by each of the radio base stations 100 and 110. The SRS is composed of a maximum of 6 symbols in one subframe.

The radio base stations 100 and 110 measure uplink quality by using the SRS received via the PUSCH and estimate a downlink state based on the measurement result. The radio base stations 100 and 110 perform downlink beam forming (or precoding) based on the estimation.

Figure 2:
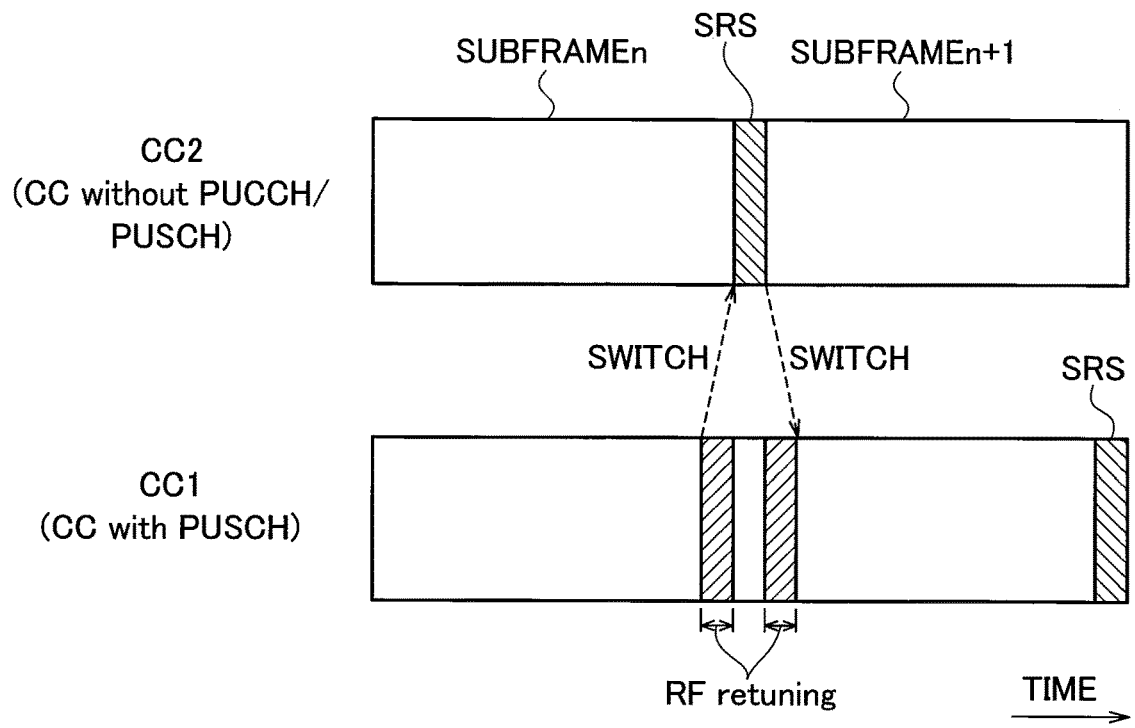
FIG. 2 is a diagram for explaining SRS carrier switching.

FIG. 2 is a diagram for explaining SRS carrier switching. As illustrated in FIG. 2, the terminal 200 performs SRS carrier switching to switch a carrier so as to transmit an SRS.

In a CA, a UL CC and a DL CC are generally associated with each other, but the number of DL CCs can be configured to be larger than the number of UL CCs. In other words, a DL CC that is not associated with a UL CC exists.

Since no associating UL CC exists in the DL CC, an uplink channel such as a PUSCH is not configured. Therefore, the terminal 200 cannot transmit an SRS for the DL CC.

In this case, in order to transmit the SRS, as illustrated in FIG. 2, the terminal 200 temporarily switches the DL CC to the UL CC and transmits the SRS.

Specifically, in order to transmit the SRS for a CC2 in the CC2, which is the DL CC that is not associated with the UL CC, the terminal 200 performs processing for retuning a transmission high-frequency circuit from a frequency of a CC1 for uplink transmission to a frequency of the CC2 (RF retuning) and switches a transmission carrier. When the terminal 200 finishes transmitting the SRS for the CC2, the terminal 200 retunes the transmission high-frequency circuit from the frequency of the CC2 to the frequency of the CC1.

Note that, in the RF retuning, the terminal 200 may retune the circuit to a different frequency near the frequency of the CC2, instead of retuning to the frequency of the CC2.

While the RF retuning is being performed, the terminal 200 cannot transmit at least a signal.

As the capability of the terminal 200, the terminal 200 can notify the radio base stations 100 and 110 of a period (CC switching time, also called SRS-Switchingtime) during which no signal transmission and reception is performed while RF retuning is being performed.

For example, if the frequency of the switching destination CC belongs to the frequency band specified in NR, the terminal 200 notifies the following capability by using a Radio Resource Control (RRC) message.

SRS-SwitchingTimeNR={n0us, n30us, n100us, n140us, n200us, n300us, n500us, n900us}

Note that n0us, n30us, n100us, n140u, n200us, n300us, n500us, and n900us represent 0 μs, 30 μs, 100 μs, 140 μs, 200 μs, 300 μs, 500 μs, and 900 μs, respectively.

On the other hand, if the frequency of the switching destination CC belongs to a frequency band defined in EUTRA, the terminal 200 notifies the following capability by using an RRC message.

SRS-SwitchingTimeEUTRA={n0, n0dot5, n1, n1dot5, n2, n2dot5, n3, n3dot5, n4, n4dot5, n5, n5dot5, n6, n6dot5, n7}

Note that n0, n0dot5, n1, n1dot5, n2, n2dot5, n3, n3dot5, n4, n4dot5, n5, n5dot5, n6, n6dot5, and n7 represent 0 OFDM symbols, 0.5 OFDM symbols, 1 OFDM symbol, 1.5 OFDM symbols, 2 OFDM symbols, 2.5 OFDM symbols, 3 OFDM symbols, 3.5 OFDM symbols, 4 OFDM symbols, 4.5 OFDM symbols, 5 OFDM symbols, 5.5 OFDM symbols, 6 OFDM symbols, 6.5 OFDM symbols, and 7 OFDM symbols.

The DL CC that is associated with the UL CC is also referred to as CC with PUSCH. On the other hand, the DL CC that is not associated with the UL CC is also referred to as DL only CC, CC without PUCCH and PUSCH, and PUSCH-less CC.

In addition, the SRS carrier switching is not limited to the CA and can also operate in Multi-RAT Dual Connectivity (MR-DC) including EUTRA-NR Dual Connectivity (EN-DC), NR-NR Dual Connectivity (NR-DC), NG-RAN-E-UTRA Dual Connectivity (NGEN-DC), NR-E-UTRA Dual Connectivity (NE-DC), and the like.

As will be described later, when the terminal 200 performs the SRS carrier switching, the terminal 200 determines, for each serving cell in which a connection is established, a period during which no signal transmission and reception is performed in radio frames used in the serving cell. Note that the terminal 200 can determine a serving cell that configures a period during which no signal transmission and reception is performed according to conditions. The period during which no signal transmission and reception is performed is referred to as "Interruption length", "length to disable transmission and reception", "length to stop transmission or reception", "length to interrupt transmission or reception", "length to stop the operation of the terminal", "length to interrupt the operation of the terminal", "interruption area", "transmission and reception disabled area", "area where transmission or reception is stopped", "area where transmission or reception is interrupted", "area where the operation of the terminal is stopped", "area where the operation of the terminal is interrupted", and the like.

When the terminal 200 performs the SRS carrier switching, the terminal 200 does not perform signal transmission and reception in the communicating serving cell during the determined period.

Note that the terminal 200 may notify the radio base stations 100 and 110 of the period during which no signal transmission and reception is performed, the period being determined for each serving cell. In this case, the radio base stations 100 and 110 perform scheduling for each serving cell with reference to the period received from the terminal 200.

(2) Functional Block Configuration of Radio Communication System

Next, the functional block configuration of the radio communication system 10 will be described. Specifically, the functional block configuration of the terminal 200 will be described. Hereinafter, only portions related to the features of the present embodiment will be described. Therefore, the terminal 200 also includes other functional blocks that are not directly related to the features of the present embodiment.

Figure 3:
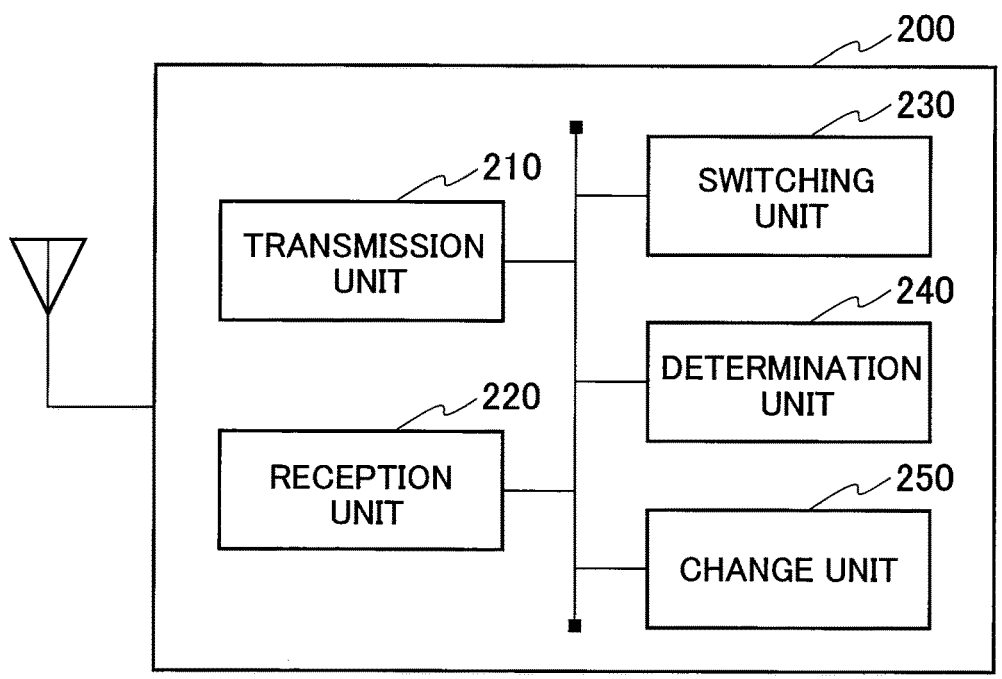
FIG. 3 is a functional block configuration diagram of a terminal 200.

FIG. 3 is a functional block configuration diagram of the terminal 200. As illustrated in FIG. 3, the terminal 200 includes a transmission unit 210, a reception unit 220, a switching unit 230, a determination unit 240, and a change unit 250. Note that the switching unit 230, the determination unit 240, and the change unit 250 constitute a control unit of the terminal 200.

The transmission unit 210 transmits an uplink signal by using one or more UL CCs in which uplink transmission is configured among a plurality of CCs. For example, the transmission unit 210 transmits an SRS, an RRC message, and the like to the radio base stations 100 and 110. As will be described later, when the switching unit 230 performs SRS carrier switching, the transmission unit 210 interrupts signal transmission during the period determined by the determination unit 240.

The reception unit 220 receives a downlink signal by using one or more DL CCs in which downlink transmission is configured among the plurality of CCs. For example, the reception unit 220 receives downlink control signals and the like from the radio base stations 100 and 110. As will be described later, when the switching unit 230 performs SRS carrier switching, the reception unit 220 interrupts signal reception during the period determined by the determination unit 240.

The switching unit 230 temporarily switches the DL CC in which only downlink transmission is configured, to the UL CC in which uplink transmission is configured among the plurality of CCs, because the DL CC is not associated with the UL CC. That is, the switching unit 230 performs the SRS carrier switching. The switching unit 230 performs RF retuning during the SRS carrier switching.

The determination unit 240 detects a subcarrier spacing (SCS) or a CC switching time used in the cell in which the switching destination CC is configured. The determination unit 240 detects the type of the terminal 200 (for example, the capability of the terminal 200).

When the switching unit 230 performs the SRS carrier switching, the determination unit 240 determines the period during which no signal transmission and reception is performed by the transmission unit 210 and the reception unit 220, in the radio frames used in the serving cell, based on the SCS used in the cell in which the switching destination CC is configured.

Based on the value of the CC switching time, the determination unit 240 can determine the period during which no signal transmission and reception is performed by the transmission unit 210 and the reception unit 220, in the radio frames used in the serving cell.

As will be described later, based on conditions (for example, the type of the terminal 200), when the switching unit 230 performs the SRS carrier switching, the determination unit 240 can determine the serving cell in which the period during which no signal transmission and reception is performed by the transmission unit 210 and the reception unit 220, is configured.

As described later, the change unit 250 changes the period determined by the determination unit 240 based on the conditions.

(3) Operation of Radio Communication System 10

Next, the operation of the radio communication system 10 will be described. Specifically, an operation in which, when the terminal 200 performs the SRS carrier switching, the terminal 200 determines, for each serving cell in which a connection is established, a period during which no signal transmission and reception is performed in radio frames used in the serving cell, and other operations will be described.

(3.1) Configuration of Period During which No Signal Transmission and Reception is Performed The terminal 200 determines the period during which no signal transmission and reception is performed in the radio frames used in the serving cell, based on the subcarrier spacing (SCS) used in the cell in which the switching destination CC is configured.

In the NR, 30 kHz, 60 kHz, and 120 kHz are supported as the SCS on the basis of 15 kHz that is the SCS in the LTE. Therefore, there are 15 kHz, 30 kHz, 60 kHz, and 120 kHz as the SCS in the NR.

Note that, in the present embodiment, the number of slots of radio frames is used as the period during which no signal transmission and reception is performed. In addition to the number of slots, the number of subframes of radio frames may also be used as the period. In addition, the period may also be determined by direct designation of time.

In the NR, a slot, a subframe, and a radio frame are composed of a plurality of Orthogonal Frequency Division Multiplexing (OFDM) symbols. The slot is composed of 14 OFDM symbols regardless of the SCS. The subframe is configured as a 1 ms spacing. The radio frame is composed of 10 subframes.

The terminal 200 may determine the period during which no signal transmission and reception is performed in the radio frames used in the serving cell, based on the value of the CC switching time.

In the DC, the period determined by the terminal 200 when the first radio base station (for example, the radio base station 100) using the switching destination CC and the second radio base station (for example, the radio base station 110) using the CC used in the serving cell are synchronized with each other (hereinafter referred to as Sync-DC), may be different from the period determined by the terminal 200 when the first radio base station and the second radio base station are not synchronized with each other (hereinafter referred to as Async-DC).

Specifically, the period determined in the case of Async-DC is longer than the period determined in the case of Sync-DC. In the present embodiment, for example, 1 slot is added to the determined number of slots.

In the CA, the period determined by the terminal 200 when the first frequency band of the switching destination CC is different from the second frequency band of the CC used in the serving cell (hereinafter referred to as inter-band CA), may be different from the period determined by the terminal 200 when the first frequency band is the same as the second frequency band (hereinafter referred to as intra-band CA).

Specifically, in the case of intra-band CA, the RF retuning may not be performed at the time of the SRS carrier switching, or it is only necessary to turn on the transmission high-frequency circuit. Thus, the period determined in the case of intra-band CA may be shorter than the period determined in the case of inter-band CA. In the present embodiment, for example, in the case of intra-band CA, the period during which no signal transmission and reception is performed is determined after reducing the determined number of slots or omitting the CC switching time.

The terminal 200 may change the determined period according to a magnitude of a timing adjustment value (TA value) for adjusting the transmission timing of the carrier used in the serving cell. In the present embodiment, for example, a difference may be provided in the determined period when the TA value is within 1 slot and the determined period when the TA value is within 2 slots. Specifically, when the TA value is within 2 slots, the terminal 200 adds 1 slot to the determined number of slots.

(3.1.1) Configuration Example 1

Figure 4:
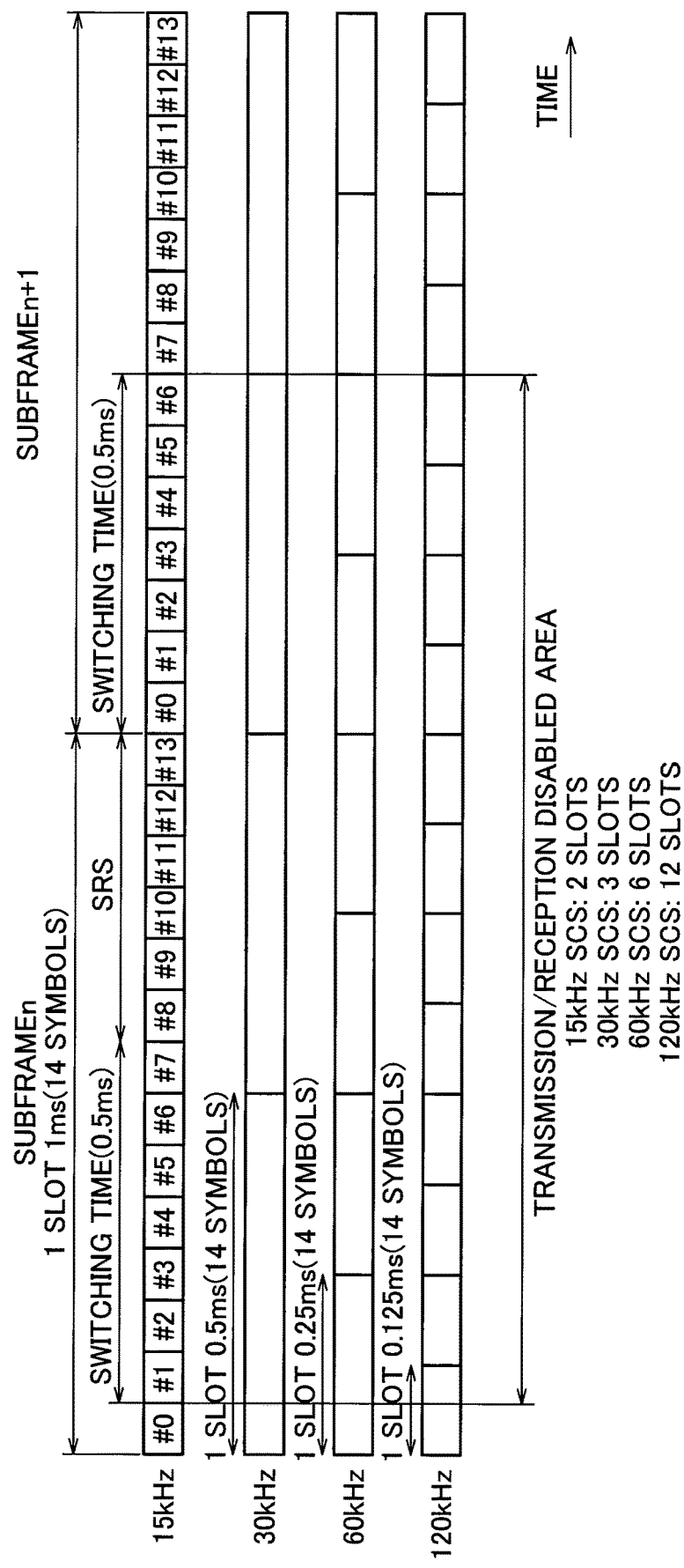
FIG. 4 is a diagram for explaining Configuration Example 1 of a period during which no signal transmission and reception is performed.

FIG. 4 is a diagram for explaining Configuration Example 1 of a period during which no signal transmission and reception is performed. Configuration Example 1 is a case where the SCS used in the cell in which the switching destination CC is configured is 15 kHz, the CC switching time is 500 µs, and the DC is Sync-DC.

In this case, as illustrated in FIG. 4, the terminal 200 determines the number of slots in which no signal transmission and reception is performed, for each serving cell, so that the slots include the total CC switching time of 1,000 (=2×500) µs and the time width of 6 symbols configured for SRS transmission.

Specifically, in a serving cell in which the SCS is 15 kHz, the terminal 200 does not perform signal transmission and reception only during the time width of 2 slots in the radio frame used in the serving cell.

In a serving cell in which the SCS is 30 kHz, the terminal 200 does not perform signal transmission and reception only during the time width of 3 slots in the radio frame used in the serving cell.

In a serving cell in which the SCS is 60 kHz, the terminal 200 does not perform signal transmission and reception only during the time width of 6 slots in the radio frame used in the serving cell.

In a serving cell in which the SCS is 120 kHz, the terminal 200 does not perform signal transmission and reception only during the time width of 12 slots in the radio frame used in the serving cell.

In the case of Async-DC or when the TA value is within slots, the terminal 200 adds 1 slot to the determined number of slots. In the case of intra-band CA, the terminal 200 determines the number of slots in which no signal transmission and reception is performed after reducing the determined number of slots or omitting the CC switching time (500 µs).

Note that, in the serving cell in which the SCS is 60 kHz or 120 kHz, the number of slots in which no signal transmission and reception is performed can be reduced if the CC switching time is a small value such as 200 µs.

(3.1.2) Configuration Example 2

Figure 5:
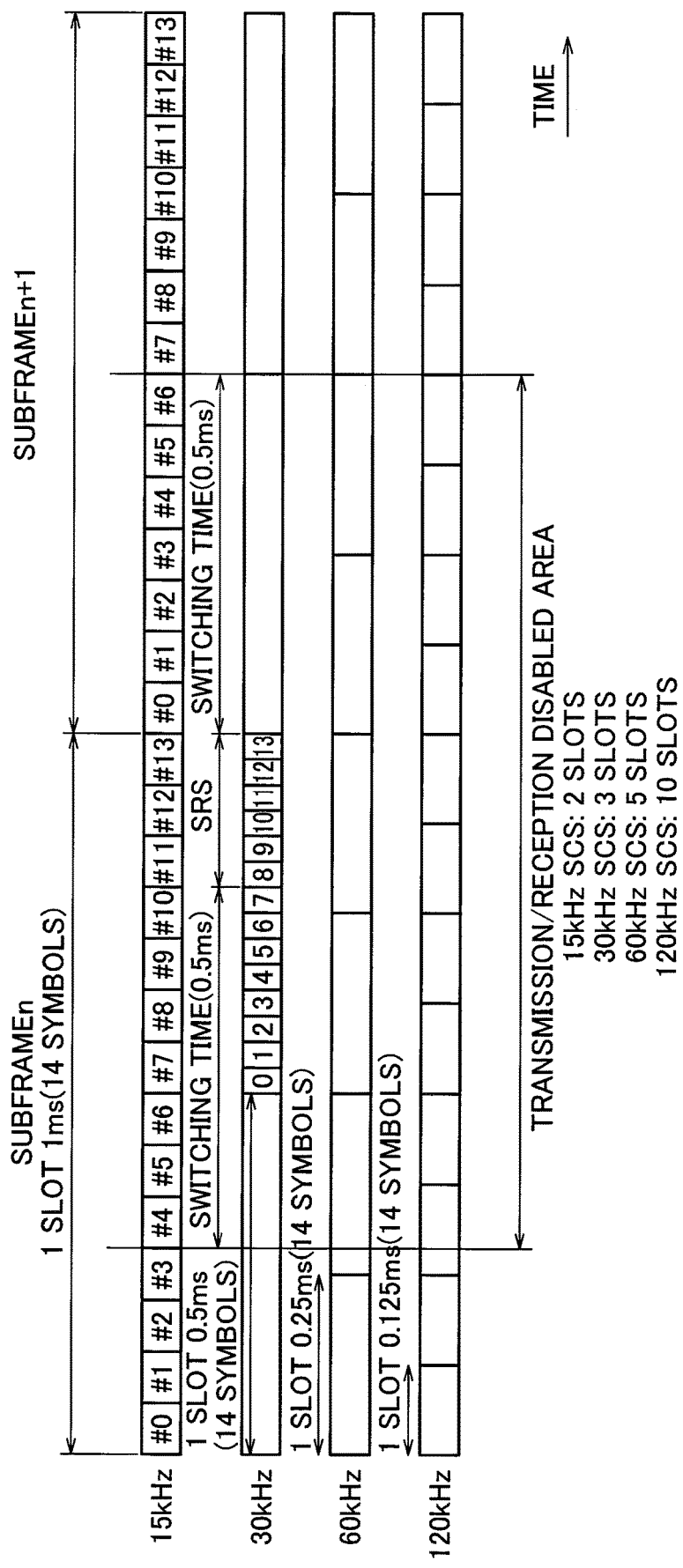
FIG. 5 is a diagram for explaining Configuration Example 1 of a period during which no signal transmission and reception is performed.

FIG. 5 is a diagram for explaining Configuration Example 2 of a period during which no signal transmission and reception is performed. Configuration Example 2 is a case where the SCS used in the cell in which the switching destination CC is configured is 30 kHz, the CC switching time is 500 µs, and the DC is Sync-DC.

In this case, as illustrated in FIG. 5, the terminal 200 determines the number of slots in which no signal transmission and reception is performed, for each serving cell, so that the slots include the total CC switching time of 1,000 (=2×500) µs and the time width of 6 symbols configured for SRS transmission.

Specifically, in a serving cell in which the SCS is 15 kHz, the terminal 200 does not perform signal transmission and reception only during the time width of 2 slots in the radio frame used in the serving cell.

In a serving cell in which the SCS is 30 kHz, the terminal 200 does not perform signal transmission and reception only during the time width of 3 slots in the radio frame used in the serving cell.

In a serving cell in which the SCS is 60 kHz, the terminal 200 does not perform signal transmission and reception only during the time width of 5 slots in the radio frame used in the serving cell.

In a serving cell in which the SCS is 120 kHz, the terminal 200 does not perform signal transmission and reception only during the time width of 10 slots in the radio frame used in the serving cell.

In the case of Async-DC or when the TA value is within 5 slots, the terminal 200 adds 1 slot to the determined number of slots. In the case of intra-band CA, the terminal 200 determines the number of slots in which no signal transmission and reception is performed after reducing the determined number of slots or omitting the CC switching time (500 μs).

Note that, in the serving cell in which the SCS is 60 kHz or 120 kHz, the number of slots in which no signal transmission and reception is performed can be reduced if the CC switching time is a small value such as 200 μs.

(3.1.3) Configuration Example 3

Figure 6:
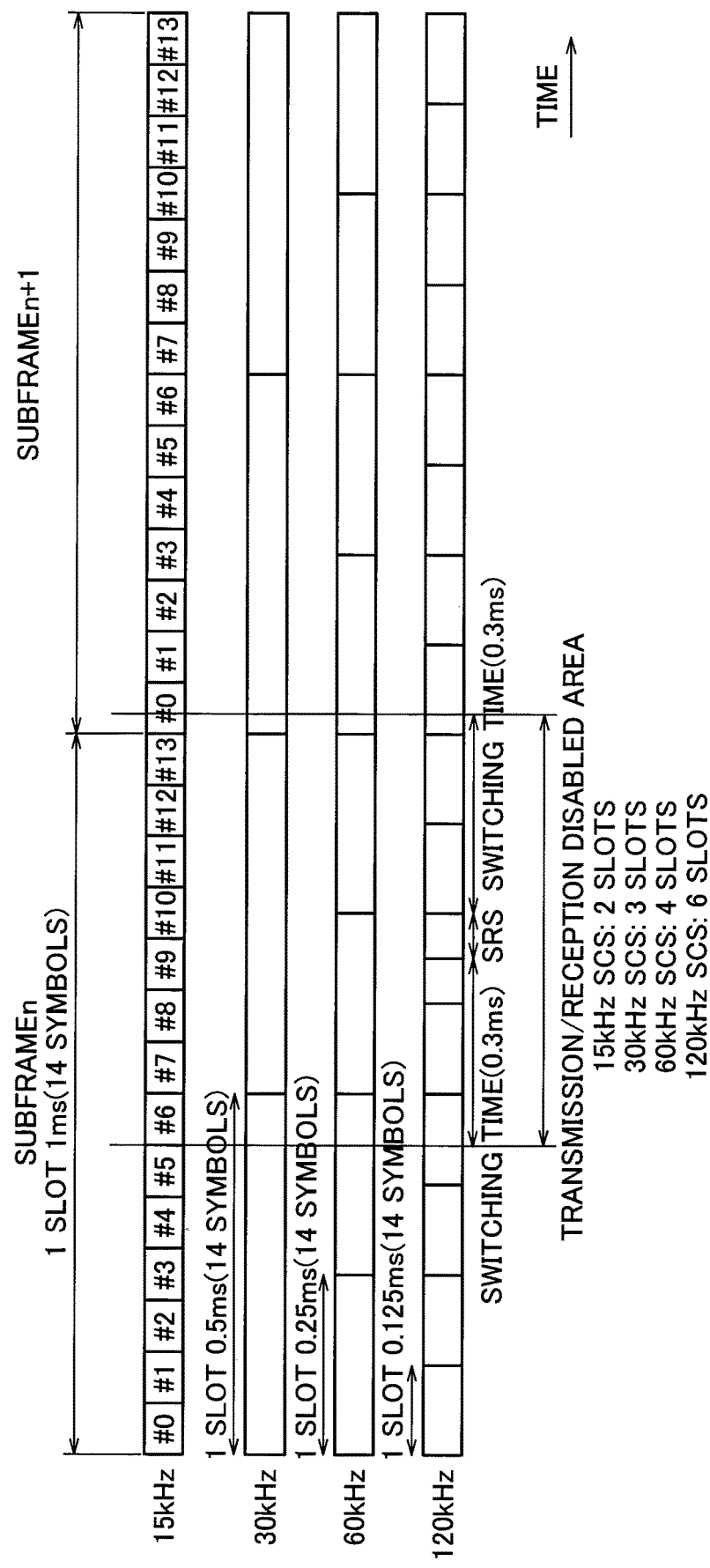
FIG. 6 is a diagram for explaining Configuration Example 3 of a period during which no signal transmission and reception is performed.

FIG. 6 is a diagram for explaining Configuration Example of a period during which no signal transmission and reception is performed. Configuration Example 3 is a case where the SCS used in the cell in which the switching destination CC is configured is 120 kHz, the CC switching time is 300 μs, and the DC is Sync-DC.

In this case, as illustrated in FIG. 6, the terminal 200 determines the number of slots in which no signal transmission and reception is performed, for each serving cell, so that the slots include a total CC switching time of 600 (=2×300) μs and a time width of 6 symbols configured for SRS transmission.

Specifically, in a serving cell in which the SCS is 15 kHz, the terminal 200 does not perform signal transmission and reception only during the time width of 2 slots in the radio frame used in the serving cell.

In a serving cell in which the SCS is 30 kHz, the terminal 200 does not perform signal transmission and reception only during the time width of 3 slots in the radio frame used in the serving cell.

In a serving cell in which the SCS is 60 kHz, the terminal 200 does not perform signal transmission and reception only during the time width of 4 slots in the radio frame used in the serving cell.

In a serving cell in which the SCS is 120 kHz, the terminal 200 does not perform signal transmission and reception only during the time width of 6 slots in the radio frame used in the serving cell.

In the case of Async-DC or when the TA value is within slots, the terminal 200 adds 1 slot to the determined number of slots. In the case of intra-band CA, the terminal 200 determines the number of slots in which no signal transmission and reception is performed after reducing the determined number of slots or omitting the CC switching time (300 μs).

Note that, in the serving cell in which the SCS is 60 kHz or 120 kHz, the number of slots in which no signal transmission and reception is performed can be reduced if the CC switching time is a small value such as 200 μs.

(3.2) Other Configurations

When the terminal 200 performs the SRS carrier switching, the terminal 200 may perform the following operation in addition to the operation of not performing the signal transmission and reception.

When the terminal 200 performs the SRS carrier switching in the serving cell while performing a random access, the preamble does not have to be retransmitted in a secondary cell (SCell) because no uplink resource for preamble transmission exists.

When the terminal 200 performs the SRS carrier switching in the serving cell while adding or releasing a primary SCell (PSCell) or while activating or deactivating a SCell, the time until the processing is completed may be configured to be longer than usual because channel state information (CSI) cannot be transmitted.

When the terminal 200 performs the SRS carrier switching while performing measurement (for example, L3 measurement), the time until the measurement is completed may be configured to be longer than usual because a report cannot be transmitted.

(3.3) Application Conditions

When the terminal 200 performs the SRS carrier switching based on the conditions, the terminal 200 may determine a serving cell that configures the period during which no signal transmission and reception is performed. Furthermore, when the terminal 200 performs the SRS carrier switching based on the conditions, the terminal 200 may shorten the period during which no signal transmission and reception is performed.

Specifically, when the terminal 200 is a terminal supporting the Per-FR gap, the terminal 200 determines a serving cell that configures a period during which no signal transmission and reception is performed, based on an SCS used in a cell in which a switching source CC is configured and an SCS used in a cell in which a switching destination CC is configured.

For example, the NR specifies that the SCS that can be used for signal transmission and reception is 15 kHz, 30 kHz, and 60 kHz in FR1, and the SCS that can be used for signal transmission is 120 kHz in FR2. Therefore, when the terminal 200 is a terminal supporting the Per-FR gap and performs the CC switching within FR2, the terminal 200 may configure the period in which no signal transmission and reception is performed, only for the serving cell in which the CC included in FR2 is configured.

When the terminal 200 performs the SRS carrier switching in association with capability other than the Per-FR gap or signaling, the terminal 200 may determine a serving cell that configures a period during which no signal transmission and reception is performed, based on the association.

When the terminal 200 performs the SRS carrier switching by introducing new capability or signaling, the terminal 200 may determine a serving cell that configures a period during which no signal transmission and reception is performed, based on the capability or signaling.

In addition, regarding the configuration for other terminal operations such as the random access and the measurement described above, the terminal 200 may make determination in association with the operation of configuring the period during which no signal transmission and reception is performed, based on the above-described Per-FR gap. Alternatively, the terminal 200 may determine the configuration for other terminal operations based on other capability or signaling.

FIG. 7 is a diagram illustrating an association between a subcarrier spacing used in a cell in which a switching destination CC is configured and a period during which no signal transmission and reception is performed, in a terminal supporting a Per-UE gap. FIG. 8 is a diagram illustrating an association between a subcarrier spacing used in a cell in which a switching destination CC is configured and a period during which no signal transmission and reception is performed, in a terminal supporting a Per-FR gap.

Referring to the associations illustrated in FIGS. 7 and 8, the terminal 200 may determine a period during which no signal transmission and reception is performed in radio frames used in a serving cell, based on a type of the terminal 200 and an SCS used in a cell in which a switching destination CC is configured.

FIG. 9 is a diagram illustrating an association between a CC switching time and a period during which no signal transmission and reception is performed, in a terminal supporting a Per-UE gap. Note that the CC switching time illustrated in FIG. 9 corresponds to the CC switching time that the terminal 200 notifies to the radio base stations 100 and 110 as the capability of the terminal 200.

Referring to the association illustrated in FIG. 9, the terminal 200 may determine a period during which no signal transmission and reception is performed in radio frames used in a serving cell, based on a type of the terminal 200 and a CC switching time.

Note that the CC switching time may be divided into two groups to determine a period during which no signal transmission and reception is performed. For example, when the subcarrier spacing used in the cell in which the switching destination CC is configured is 120 kHz, the terminal 200 determines that signal transmission and reception is not performed in the time width of 6 slots if the CC switching time is 500 μs or more, and determines that signal transmission and reception is not performed in the time width of 5 slots if the CC switching time is less than 500 μs.

FIG. 10 is a diagram illustrating a condition for applying, to the terminal 200, a configuration of a period during which no signal transmission and reception is performed. In case 1, when the SCS used in the cell in which the switching source CC is configured and the SCS used in the cell in which the switching destination CC is configured are SCSs supported by LTE, the period during which no signal transmission and reception is performed is determined in all serving cells, regardless of the type of the terminal.

In case 2, when the SCS used in the cell in which the switching source CC is configured and the SCS used in the cell in which the switching destination CC is configured are SCSs supported by FR1, the period during which no signal transmission and reception is performed is determined in all serving cells, in the terminal supporting the Per-UE gap. On the other hand, the period during which no signal transmission and reception is performed is determined for only signals in the serving cell of FR1, in the terminal supporting the Per-FR gap.

In cases 3 and 4, when one of the SCS used in the cell in which the switching source CC is configured and the SCS used in the cell in which the switching destination CC is configured is supported by FR1 and the other thereof is supported by FR2, the period during which no signal transmission and reception is performed is determined in all serving cells, regardless of the type of the terminal.

In case 5, when the SCS used in the cell in which the switching source CC is configured and the SCS used in the cell in which the switching destination CC is configured are SCSs supported by FR2, the period during which no signal transmission and reception is performed is determined in all serving cells, in the terminal supporting the Per-UE gap. On the other hand, the period during which no signal transmission and reception is performed is determined for only signals in the serving cell of FR2, in the terminal supporting the Per-FR gap.

(3.5) Operation Example

FIG. 11 is a diagram illustrating an operation flow of the terminal 200 when a period during which no signal transmission and reception is performed is determined. As illustrated in FIG. 11, the terminal 200 detects an SCS or a CC switching time used in a cell in which a switching destination CC is configured (S1).

The terminal 200 determines whether to configure a period during which no signal transmission and reception is performed in a serving cell (S3). For example, as illustrated in FIG. 10, the terminal 200 determines whether to configure the period during which no signal transmission and reception is performed in the serving cell, based on the type of the terminal, the SCS used in the cell in which the switching source CC is configured, and the SCS used in the cell in which the switching destination CC is configured.

If the terminal 200 configures the period during which no signal transmission and reception is performed (YES in S3), the terminal 200 determines the period during which no signal transmission and reception is performed in radio frames used in the serving cell (S5).

For example, referring to the associations illustrated in FIGS. 7 and 8, the terminal 200 determines the period during which no signal transmission and reception is performed in the radio frames used in the serving cell, based on the type of the terminal 200 and the SCS used in the cell in which the switching destination CC is configured.

Referring to the association illustrated in FIG. 9, the terminal 200 may determine the period during which no signal transmission and reception is performed in the radio frames used in the serving cell, based on the type of the terminal 200 and the CC switching time.

The terminal 200 determines whether to change the determined period (S7). For example, in the case of Async-DC, in the case of intra-band CA, or when the TA value is within 2 slots, the terminal 200 determines to change the determined period.

If the terminal 200 determines to change the determined period (YES in S7), the terminal 200 changes the period (S9). For example, in the case of Async-DC, or when the TA value is within 2 slots, the terminal 200 adds 1 slot to the determined number of slots and ends the processing. In the case of intra-band CA, the terminal 200 reduces the determined number of slots and ends the processing.

Note that, in the case of intra-band CA, the terminal 200 may determine the period during which no signal transmission and reception is performed after omitting the CC switching time in S5, and may determine not to change the determined period in S7.

If the terminal 200 does not configure the period during which no signal transmission and reception is performed (NO in S3), or if the terminal 200 determines not to change the determined period (NO in S7), the terminal 200 ends the processing.

(4) Operation and Effect

According to the above-described embodiment, the terminal 200 transmits the SRS. The terminal 200 switches the CC so as to transmit the SRS. In this case, the terminal 200 determines the period during which no signal transmission and reception is performed in the radio frames used in the serving cell, based on the SCS used in the cell in which the switching destination CC is configured.

With this configuration, even if the transmission of the terminal 200 becomes impossible due to the RF retuning during the SRS carrier switching, it is possible to perform scheduling so that the terminal 200 does not perform signal transmission and reception in the serving cell during the switching.

Therefore, this feature can reduce the influence on communication in the serving cell.

According to the present embodiment, the terminal 200 transmits the SRS. The CC is switched so as to transmit the SRS. In this case, the terminal 200 determines the period during which no signal transmission and reception is performed in the radio frames used in the serving cell, based on the value of the CC switching time.

With this configuration, even if the transmission of the terminal 200 becomes impossible due to the RF retuning during the SRS carrier switching, it is possible to perform scheduling so that the terminal 200 does not perform signal transmission and reception in the serving cell during the switching.

Therefore, this feature can reduce the influence on communication in the serving cell.

According to the present embodiment, in the DC, when the first radio base station using the switching destination CC and the second radio base station using the CC used in the serving cell are not synchronized with each other, the terminal 200 makes the period longer than the period determined when the first radio base station and the second radio base station are synchronized with each other.

With this configuration, scheduling can be performed so that the terminal 200 does not perform signal transmission and reception in the serving cell in consideration of subframe deviation. Therefore, this feature can further reduce the influence on communication in the serving cell.

According to the present embodiment, in the CA, when the first frequency band of the switching destination CC is the same as the second frequency band of the CC used in the serving cell, the terminal 200 makes the period shorter than the period determined when the first frequency band is different from the second frequency band.

With this configuration, scheduling can be performed so that the terminal 200 does not perform signal transmission and reception in the serving cell in consideration of the difference between the frequency bands of the CC. Therefore, this feature can efficiently reduce the influence on communication in the serving cell.

According to the present embodiment, the terminal 200 determines the serving cell that configures the period during which no signal transmission and reception is performed, depending on whether the terminal 200 has an ability to configure the period for performing different frequency measurement for each FR.

With this configuration, scheduling can be performed so that the terminal 200 does not perform signal transmission and reception in the serving cell, depending on whether the terminal 200 is the terminal supporting the Per-FR gap. Therefore, this feature can efficiently reduce the influence on communication in the serving cell.

(5) Other Embodiments

Although the contents of the present invention have been described along with the embodiment, the present invention is not limited to these descriptions, and it is obvious to those skilled in the art that various modifications and improvements can be made thereto.

The block configuration diagram (FIG. 3) used for explaining the above-described embodiment illustrates blocks of functional unit. Those functional blocks (structural components) are realized by a desired combination of at least one of hardware and software. A method for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (structural component) that causes transmitting is called a transmitting unit or a transmitter. For any of the above, as explained above, the realization method is not particularly limited to any one method.

Figure 12:
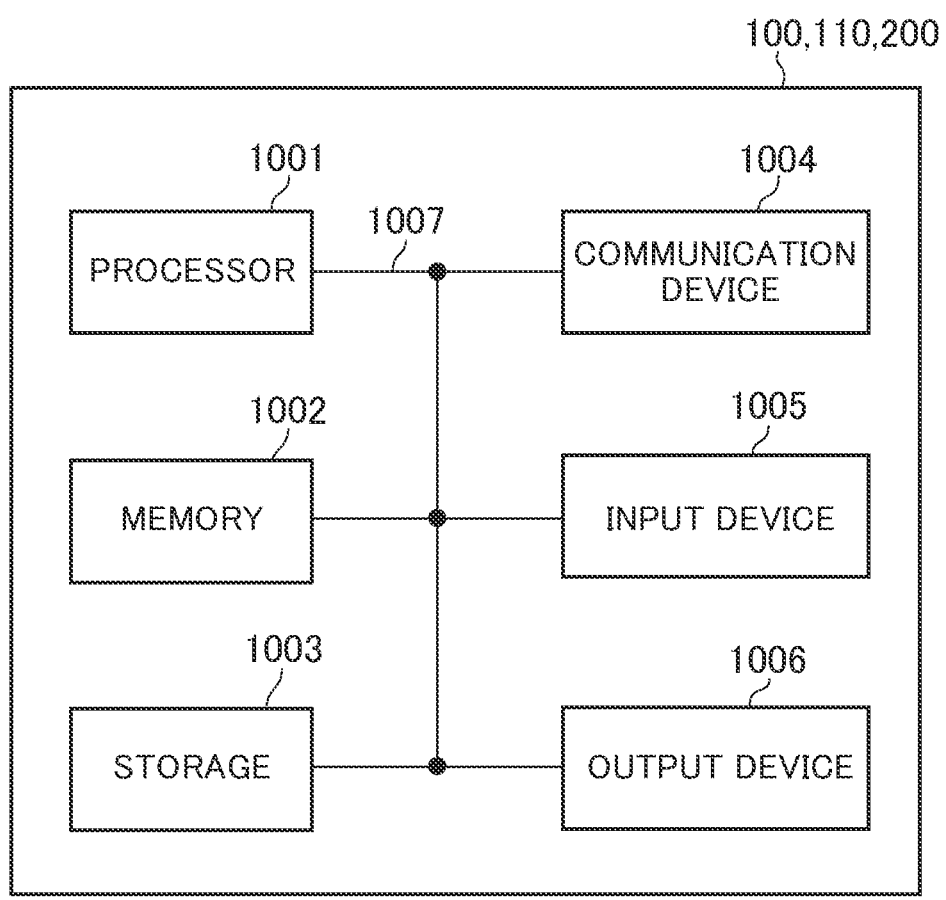
FIG. 12 is a diagram illustrating an example of a hardware configuration of the terminal 200.

Furthermore, the terminal 200 explained above may function as a computer that performs the processing of the radio communication method of the present disclosure. FIG. 12 is a diagram illustrating an example of a hardware configuration of the terminal. As illustrated in FIG. 12, the terminal can be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. A hardware configuration of the device may be constituted by including one or plurality of the devices illustrated in the figure, or may be constituted without including some of the devices.

The functional blocks of the device are realized by any of hardware elements of the computer device or a desired combination of the hardware elements.

Moreover, the processor 1001 performs operation by loading a predetermined software (program) on hardware such as the processor 1001 and the memory 1002, and realizes various functions of the device by controlling communication via the communication device 1004, and controlling at least one of reading and writing of data on the memory 1002 and the storage 1003.

The processor 1001, for example, operates an operating system to control the entire computer. The processor 1001 can be configured with a central processing unit (CPU) including an interface with a peripheral device, a control device, an operation device, a register, and the like.

Moreover, the processor 1001 reads a program (program code), a software module, data, and the like from at least one of the storage 1003 and the communication device 1004 into the memory 1002, and executes various processing according to them. As the program, a program that is capable of executing on the computer at least a part of the operation explained in the above embodiments, is used. Alternatively, various processing explained above may be executed by one processor 1001 or may be executed simultaneously or sequentially by two or more processors 1001. The processor 1001 may be implemented by using one or more chips. Alternatively, the program may be transmitted from a network via a telecommunication line.

The memory 1002 is a computer readable recording medium and may be configured, for example, with at least one of Read Only Memory (ROM), Erasable Programmable ROM (EPROM), Electrically Erasable Programmable ROM (EEPROM), Random Access Memory (RAM), and the like. The memory 1002 can be called register, cache, main memory (main storage device), and the like. The memory 1002 can store therein a program (program codes), software modules, and the like that can execute the method according to the embodiment of the present disclosure.

The storage 1003 is a computer readable recording medium. Examples of the storage 1003 include at least one of an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 may be called an auxiliary storage device. The recording medium can be, for example, a database including at least one of the memory 1002 and the storage 1003, a server, or other appropriate medium.

The communication device 1004 is hardware (transmission and reception device) capable of performing communication between computers via at least one of a wired network and a wireless network. The communication device 1004 is also called, for example, a network device, a network controller, a network card, a communication module, and the like.

The communication device 1004 may include a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information therebetween. The bus 1007 may be constituted by a single bus or may be constituted by separate buses between the devices.

Further, the device may be configured to include hardware such as a microprocessor, Digital Signal Processor (DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

Notification of information is not limited to that explained in the above aspect/embodiment, and may be performed by using a different method. For example, the notification of information may be performed by physical layer signaling (for example, Downlink Control Information (DCI), Uplink Control Information (UCI), higher layer signaling (for example, RRC signaling, Medium Access Control (MAC) signaling, broadcast information (Master Information Block (MIB) and System Information Block (SIB)), other signals, or a combination of these. The RRC signaling may be called RRC message, for example, or may be RRC Connection Setup message, RRC Connection Reconfiguration message, or the like.

Each of the above aspects/embodiments may be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the above aspects/embodiments in the present disclosure may be exchanged. For example, the various steps and the sequence of the steps of the methods explained above are exemplary and are not limited to the specific order mentioned above.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is explained; however, a combination of a plurality of other network nodes (for example, MME and S-GW) may be used.

Information and signals (information and the like) can be output from a higher layer (or lower layer) to a lower layer (or higher layer). It may be input and output via a plurality of network nodes.

The input and output information can be stored in a specific location (for example, a memory) or may be managed in a management table. The information to be input and output can be overwritten, updated, or added. The information may be deleted after outputting. The inputted information may be transmitted to another device.

The determination may be made by a value (0 or 1) represented by one bit or by Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, and it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, optical fiber cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

Note that the terms described in the present disclosure and terms necessary for understanding the present disclosure may be replaced by terms having the same or similar meanings. For example, at least one of a channel and a symbol may be a signal (signaling). Also, a signal may be a message. Further, a component carrier (CC) may be referred to as a carrier frequency, a cell, a frequency carrier, or the like.

The terms "system" and "network" used in the present disclosure can be used interchangeably.

Furthermore, the information, the parameter, and the like explained in the present disclosure may be represented by an absolute value, may be expressed as a relative value from a predetermined value, or may be represented by corresponding other information. For example, the radio resource may be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of at least one of a base station and a base station subsystem that perform the communication service in this coverage.

In the present disclosure, the terms "mobile station (MS)", "user terminal", "user equipment (UE)", "terminal" and the like can be used interchangeably.

The mobile station may be called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), or a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter the same applies). For example, each of the aspects/embodiments of the present disclosure may be applied to a configuration that allows communication between a base station and a mobile station to be replaced with communication between a plurality of mobile stations (which may be referred to as, for example, Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms such as an uplink channel, a downlink channel, or the like may be read as a side channel.

Likewise, a mobile station in the present disclosure may be read as a base station. In this case, the base station may have the function of the mobile station.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using at least one of one or more wires, cables, and printed electrical connections, and as some non-limiting and non-exhaustive examples, by using electromagnetic energy having wavelengths in the radio frequency region, the microwave region, and light (both visible and invisible) region, and the like.

The reference signal may be abbreviated as RS and may be called pilot according to applicable standards.

As used in the present disclosure, the phrase "based on" does not mean "based only on" unless explicitly stated otherwise. In other words, the phrase "based on" means both "based only on" and "based at least on".

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as "a", "an", and "the" in English are added, in the present disclosure, these articles may include a plurality of nouns following these articles.

In the present disclosure, the term "A and B are different" may mean "A and B are different from each other". Note that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

INDUSTRIAL APPLICABILITY

According to the terminal described above, the terminal is useful because the influence on communication in the serving cell can be reduced even if the carrier is switched so as to transmit the channel quality measurement reference signal.

EXPLANATION OF REFERENCE NUMERALS 10 radio communication system
100 radio base station
110 radio base station
200 terminal
210 transmission unit
220 reception unit
230 switching unit
240 determination unit
250 change unit
1001 processor
1002 memory
1003 storage
1004 communication device
1005 input device
1006 output device
1007 bus

The invention claimed is:

1. A terminal comprising:
a transmitter that transmits a Sounding Reference Signal (SRS); and
a processor that switches a carrier so as to transmit the SRS,
wherein the processor determines a first period during which no signal transmission is performed in radio frames used in a serving cell, based on a subcarrier spacing of a cell corresponding to a switching destination carrier, and
the processor determines the serving cell that configures the first period during which no signal transmission is performed, based on whether the terminal has an ability to configure a second period for performing measurement of a different frequency cell for each frequency range,
when a first frequency band of the switching destination carrier is a same as a second frequency band of a carrier used in the serving cell, the processor makes the first period shorter than the first period determined when the first frequency band is different from the second frequency band,
when a first frequency band of the switching destination carrier is a same as a second frequency band of a carrier used in the serving cell, the determination of the first period is not dependent on a value of a carrier switching time, and
when the first frequency band of the switching destination carrier is different from the second frequency band of the carrier used in the serving cell, the determination of the first period is dependent on the value of the carrier switching time.

2. A radio communication method comprising:
switching a carrier so as to transmit a Sounding Reference Signal (SRS);
determining a first period during which no signal transmission is performed in radio frames used in a serving cell, based on a subcarrier spacing of a cell corresponding to a switching destination carrier; and
determining the serving cell that configures the first period during which no signal transmission is performed, based on whether a terminal has an ability to configure a second period for performing measurement of a different frequency cell for each frequency range,
wherein when a first frequency band of the switching destination carrier is a same as a second frequency band of a carrier used in the serving cell, in the determining of the first period, the first period is made shorter than the first period determined when the first frequency band is different from the second frequency band,
when a first frequency band of the switching destination carrier is a same as a second frequency band of a carrier used in the serving cell, the determination of the first period is not dependent on a value of a carrier switching time, and
when the first frequency band of the switching destination carrier is different from the second frequency band of the carrier used in the serving cell, the determination of the first period is dependent on the value of the carrier switching time.

3. A radio communication system comprising:
a terminal that transmits a Sounding Reference Signal (SRS); and
a radio base station that receives the SRS,
wherein the terminal switches a carrier so as to transmit the SRS, and
the terminal determines a first period during which no signal transmission is performed in radio frames used in a serving cell, based on a subcarrier spacing of a cell corresponding to a switching destination carrier, and
the terminal determines the serving cell that configures the first period during which no signal transmission is performed, based on whether the terminal has an ability to configure a second period for performing measurement of a different frequency cell for each frequency range,
when a first frequency band of the switching destination carrier is a same as a second frequency band of a carrier used in the serving cell, the terminal makes the first period shorter than the first period determined when the first frequency band is different from the second frequency band, when a first frequency band of the switching destination carrier is a same as a second frequency band of a carrier used in the serving cell, the determination of the first period is not dependent on a value of a carrier switching time, and when the first frequency band of the switching destination carrier is different from the second frequency band of the carrier used in the serving cell, the determination of the first period is dependent on the value of the carrier switching time.

* * * * *